Nov. 23, 1926.
C. SCHMITTUTZ
1,607,695
DEVICE FOR TREATING TIMBER, WOOD, AND THE LIKE
Filed June 19, 1924
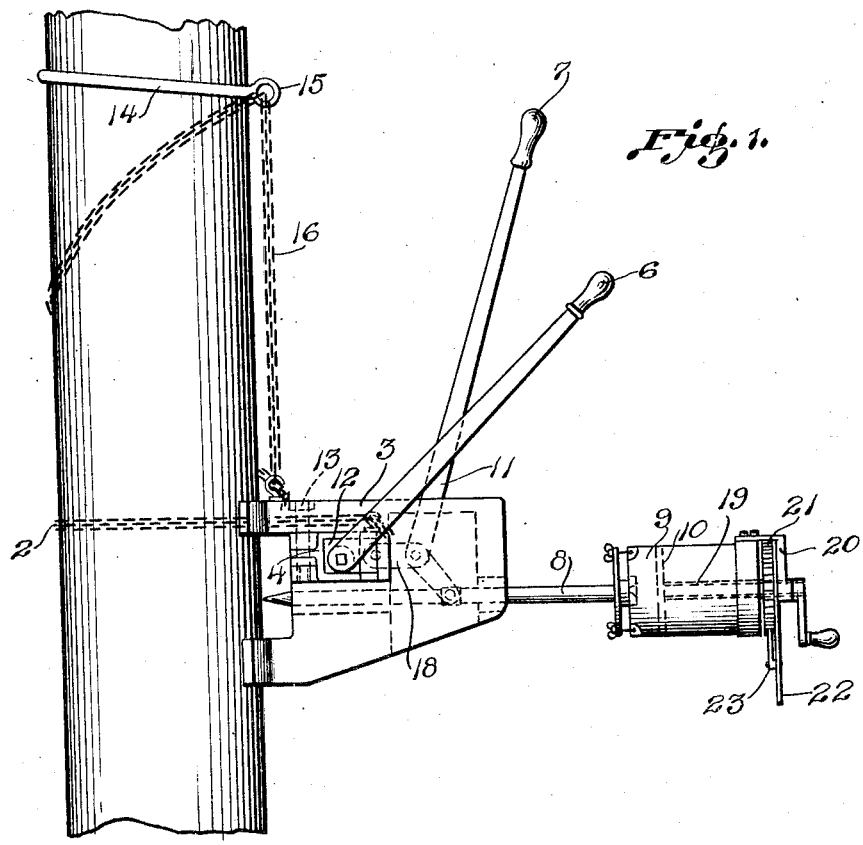
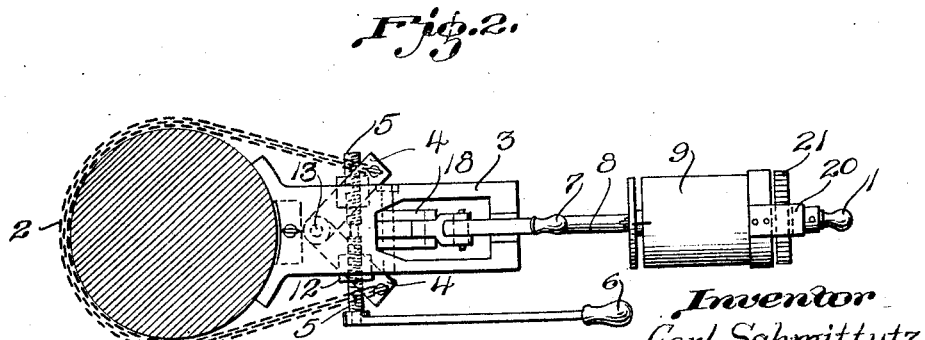
Inventor
Carl Schmittutz
By *(signature)*
Attorney Patented Nov. 23, 1926.

1,607,695

UNITED STATES PATENT OFFICE.

CARL SCHMITTUTZ, OF BAD KISSINGEN, GERMANY.

DEVICE FOR TREATING TIMBER, WOOD, AND THE LIKE.

Application filed June 19, 1924, Serial No. 721,144, and in Germany June 23, 1923.

My invention relates to a device for treating timber and woods with the object in view of preserving the same by means of a sort of vaccinating process consisting in inserting a hollow needle into the trees or forest products such as timbers and poles through which needle suitable impregnating materials then are injected.

More particularly the invention relates to a device which allows of easily performing the said vaccinating process not only upon poles lying flat on the ground but also on timber, wood and the like standing upright.

With this object in view the invention consists in using a kind of tripod as a supporting frame for the piercing and injecting mechanism, the said tripod being pressed against a pole or the like by a chain and in cases where a tree or an upright pole is to be treated another chain, cable or the like is fastened to the frame and at some higher point to the pole, whereby the latter chain serves to suspend the frame. Means are provided for an easy loosening of the first mentioned chain, in order that after every injection the device can be moved quickly to a nearby position and an injection made in the neighborhood of the preceding one. For certain reasons it is preferable to arrange the points of injection so that all points which follow one another in the direction of the axis of the pole are laterally misplaced from one another to a certain extent and do not register with each other in a vertical direction, hence the points of injection appear to form a helical curve about a pole or other cylindrical object.

Now by winding the chain or cable by which the device is suspended around the pole between the point of suspension and the tripod the invention makes it very easy to apply the injections along the line of a helical curve because the device when hauled upwards will follow the chain which itself describes such a curve.

Referring to the accompanying drawings which are made a part hereof and on which similar reference characters indicate similar parts, Figure 1 is a side view of the device suspended on an upright pole and ready for action, and Figure 2, a top plan view of the same device.

In the drawings reference character 14 indicates a tongue, claw or the like hooked or otherwise fastened to the pole at a suitable height. The claw possesses a loop 15 through which the chain 16 is drawn, the one end 17 being wound once around the pole and carrying the tripod 3 whilst the other end 16 is loosely connected with the said tripod and serves for hauling the device upward or downward.

Another chain 2 is laid horizontally around the pole and fixed to two arms 4 pivoted on the tripod for independent movement by a bolt 13. Arms 4 are adjustable by a screw 5 having threaded engagement with nuts 12 journaled in the said arms, said nuts being threaded in opposite senses and accordingly the spindle 5 has opposite threads on its two halves.

The screw is operated by a hand-lever 6. The pitch of the two threads is so high that by giving the screw a quarter turn the two arms are forced towards one another and the chain 2 will press the tripod against the pole. In order to provide for differences in the thickness of the poles to be treated this chain 2 can be shortened or lengthened as by hanging different links over a hook on one of the arms 4. Two links 18 are pivoted on the tripod and connect a hand-lever 7 pivotally to the same, the short one of said levers being operatively connected with the hollow needle 8 which is guided in the tripod in a direction at right angles to the axis of the pole.

Upon the rear end of the hollow needle a cylinder 9 is detachably fastened the hollow interior of which communicates with the hollow of the needle and contains a pasty preserving substance or other suitable liquid. A piston 10 within the cylinder is fastened to the end of a rod 19 having threads engaging threads on the cover of the cylinder and which can be turned by a crank 1 at its end. Whenever the cylinder is emptied the piston can be brought into its original position by turning this crank, then the cylinder can be unfastened from the needle, refilled, and after again being connected with the needle the piston can be moved towards the needle by again turning this crank as far as the preserving substance allows.

For the purpose of injection special means for driving the piston are provided permitting the application of a greater force upon the piston and at the same time regulating more accurately the amount of preserving substance for every injection. A ratchet wheel 21 is mounted loosely upon the spindle 19 but is prevented from turning upon the spindle by a spline projecting into a groove which extends along the spindle. An arm 20 projecting from the cover of the cylinder serves to hold the wheel 21 in place and a lever 22 is loosely mounted upon the spindle said lever carrying the click 23 for turning the wheel 21 whereby the piston is driven toward the needle pressing the pasty substance through the hollow of the needle into the trunk of the tree or the body of the pole, etc., as the case may be.

After the needle has been forced into the tree or pole and while the needle is in its most advanced position within the timber the lever 22 is to be manipulated for causing an injection, the amount of which can be regulated at will by changing the distance the lever 22 moves.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A device for preserving timber, wood, or the like comprising a hollow needle adapted to be forced into an article to be preserved, a frame for guiding and operating the needle, means for suspending the frame from said article, means for pressing the said frame against said article, means for storing the preserving substance in communication with the hollow of the needle, and means for injecting the said substance through the hollow needle into the timber, substantially as set forth.

2. A device as set forth in claim 1 comprising a chain or the like to be laid round a pole and fastened to the frame, and means for tightening and loosening the said chain, substantially as set forth.

3. A device as set forth in claim 1 comprising a chain or the like for suspending the frame on the pole, and means for supporting the chain in the form of a helix about the pole, substantially as set forth.

4. A device as set forth in claim 1 comprising a cylinder for storing the preserving substance said cylinder communicating with the hollow of the needle, a piston in the cylinder, and manually operable means for driving the piston, substantially as set forth.

In witness whereof I have signed this specification.

CARL SCHMITTUTZ.